United States Patent
Tomiyama et al.

(10) Patent No.: US 10,486,621 B2
(45) Date of Patent: Nov. 26, 2019

(54) SOUNDPROOF COVER

(71) Applicants: Sumitomo Riko Company Limited, Aichi-ken (JP); TOYOTA BOSHOKU KABUSHIKI KAISHA, Aichi-ken (JP)

(72) Inventors: Koji Tomiyama, Aichi-ken (JP); Shuka Kitamura, Aichi-ken (JP); Akio Yabu, Aichi-ken (JP); Yuhei Adachi, Aichi-ken (JP); Yasuo Suzuki, Aichi-ken (JP); Yasuhiko Maekawa, Aichi-ken (JP)

(73) Assignees: Sumitomo Riko Company Limited, Aichi-ken (JP); TOYOTA BOSHOKU KABUSHIKI KAISHA, Aichi-ken (JP)

(*) Notice: Subject to any disclaimer, the term of this patent is extended or adjusted under 35 U.S.C. 154(b) by 112 days.

(21) Appl. No.: 15/440,428

(22) Filed: Feb. 23, 2017

(65) Prior Publication Data

US 2017/0282815 A1    Oct. 5, 2017

(30) Foreign Application Priority Data

Mar. 31, 2016   (JP) ................................. 2016-072636

(51) Int. Cl.
*B60R 13/08* (2006.01)
*G10K 11/172* (2006.01)

(52) U.S. Cl.
CPC ...... *B60R 13/0884* (2013.01); *B60R 13/0815* (2013.01); *G10K 11/172* (2013.01)

(58) Field of Classification Search
CPC ............ B60R 13/0884; B60R 13/0815; G10K 11/172

USPC ......................................................... 181/286
See application file for complete search history.

(56) References Cited

U.S. PATENT DOCUMENTS

| | | | | |
|---|---|---|---|---|
| 6,290,022 | B1* | 9/2001 | Wolf ................... | G10K 11/172 181/286 |
| 7,837,008 | B1* | 11/2010 | Lane ...................... | B64G 1/22 181/198 |
| 8,025,124 | B2* | 9/2011 | Levit ........................ | F16F 9/30 181/284 |

(Continued)

FOREIGN PATENT DOCUMENTS

| | | |
|---|---|---|
| JP | 6-71938 | 10/1994 |
| JP | 6-100245 | 12/1994 |

(Continued)

*Primary Examiner* — Forrest M Phillips
(74) *Attorney, Agent, or Firm* — Greenblum & Bernstein, P.L.C.

(57) ABSTRACT

A soundproof cover is mounted to a first gear box of a power seat motor unit that is attached to a frame member of a seat and that has a motor and a gear box. In the first gear box, the axial direction of the motor is defined as the X direction, the direction of attachment to the frame member, which is one of two directions that are orthogonal to the X direction, is defined as the Y direction, and the remaining direction is defined as the Z direction. Then, the soundproof cover has: a foam disposed on at least an X-Z surface of the first gear box; a cover member disposed on the outer side of the foam; and a mass body interposed between the foam and the cover member and disposed at a position corresponding to at least the X-Z surface of the first gear box in contact with the foam.

6 Claims, 6 Drawing Sheets

(56) References Cited

U.S. PATENT DOCUMENTS

| | | | | |
|---|---|---|---|---|
| 2005/0000751 A1* | 1/2005 | Sheng | ............... | E04B 1/86 |
| | | | | 181/290 |
| 2005/0217933 A1* | 10/2005 | Sung Young | ......... | B60R 13/083 |
| | | | | 181/290 |
| 2015/0315781 A1* | 11/2015 | Kang | ............... | G10K 11/172 |
| | | | | 181/286 |

FOREIGN PATENT DOCUMENTS

| JP | 2015-069012 | 4/2015 |
|---|---|---|
| JP | 2015-209073 | 11/2015 |

\* cited by examiner

[FIG. 1]
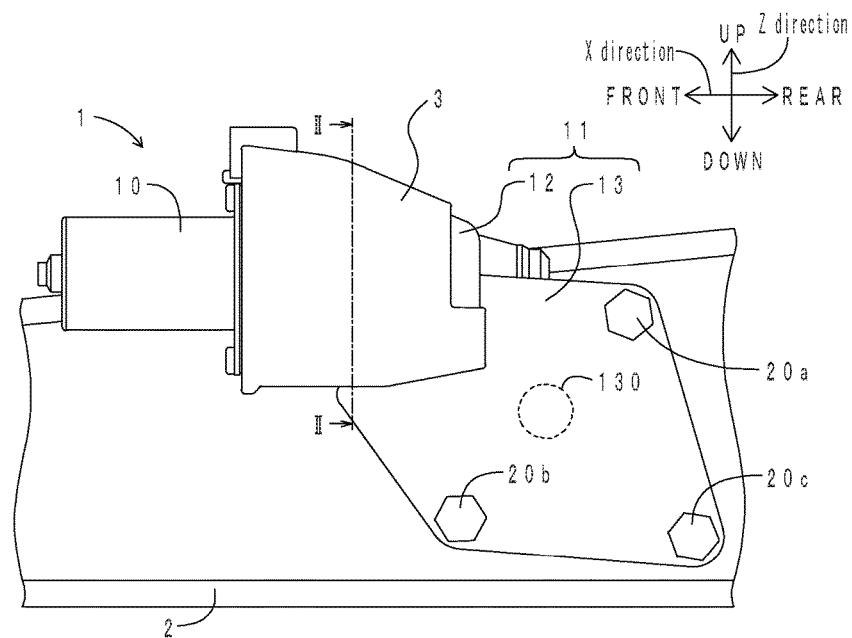
[FIG. 2]
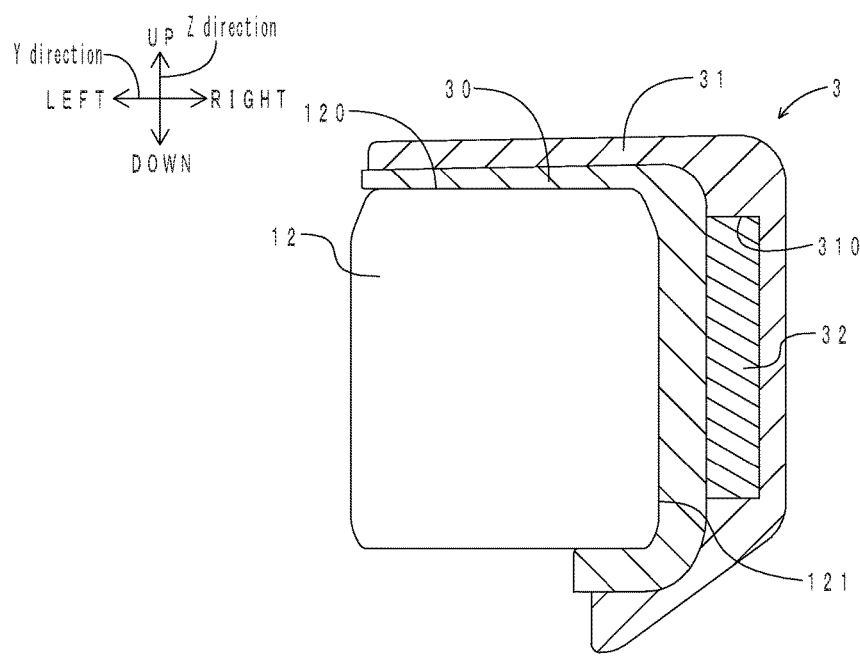

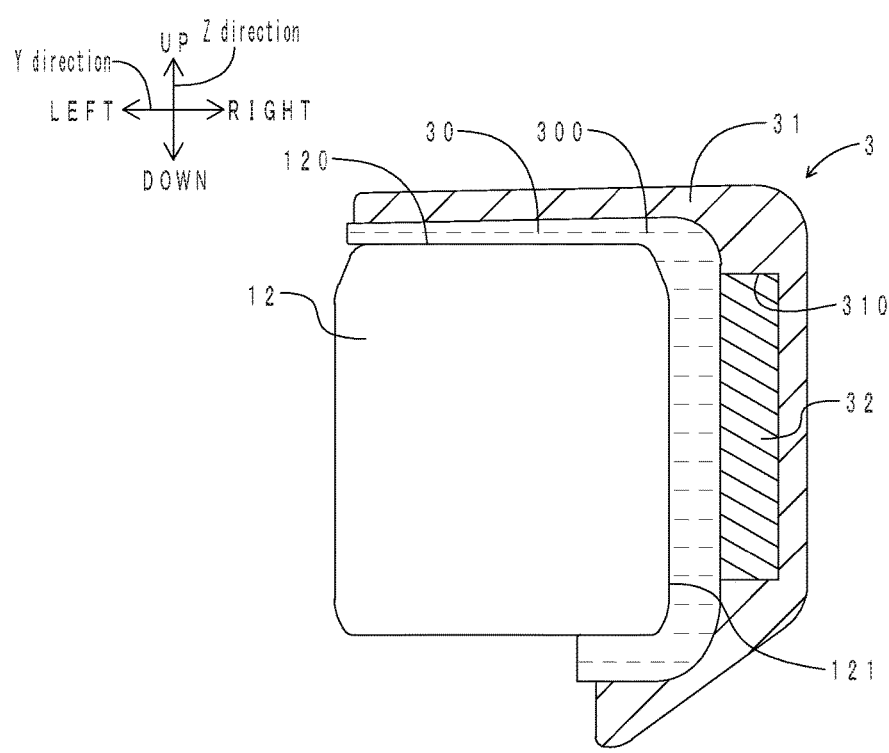
[FIG. 3]

[FIG. 4]
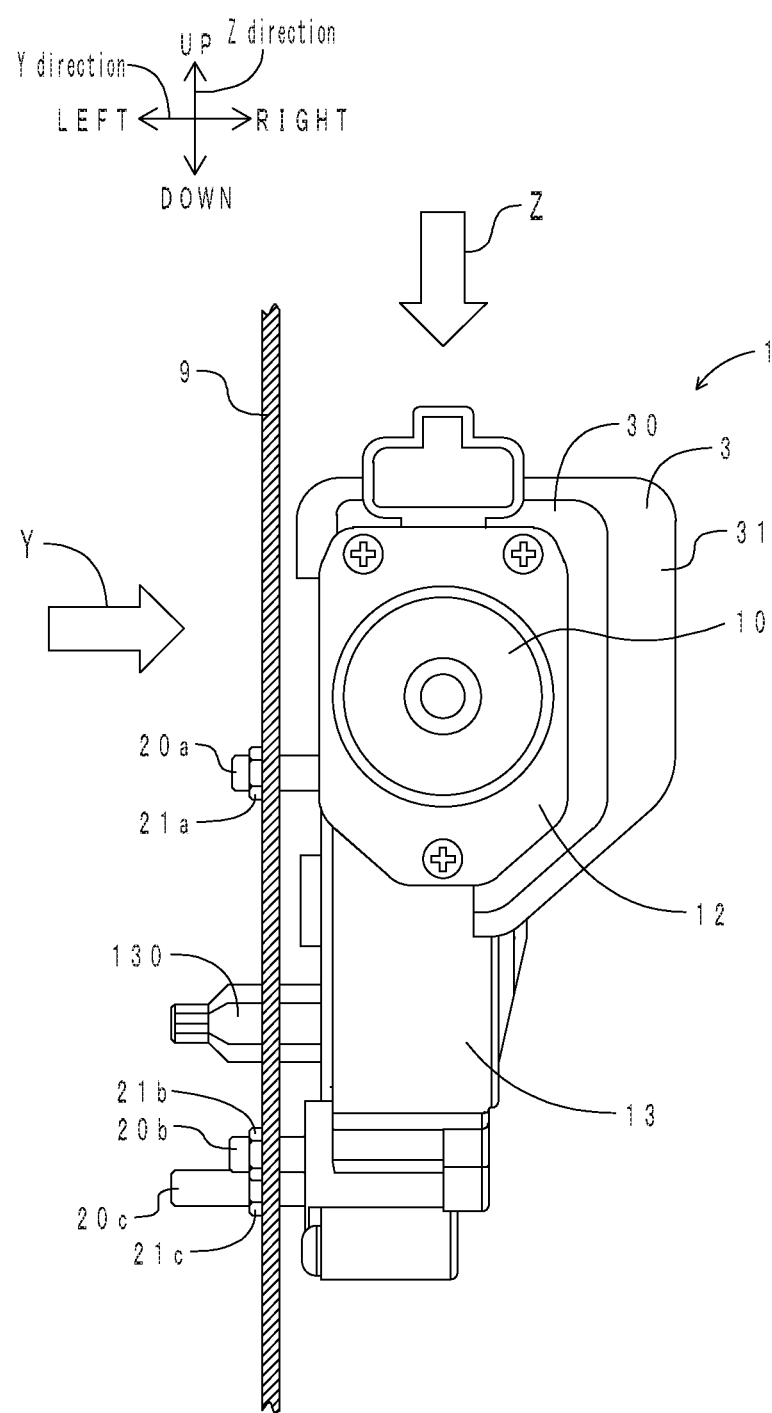

[FIG. 5]
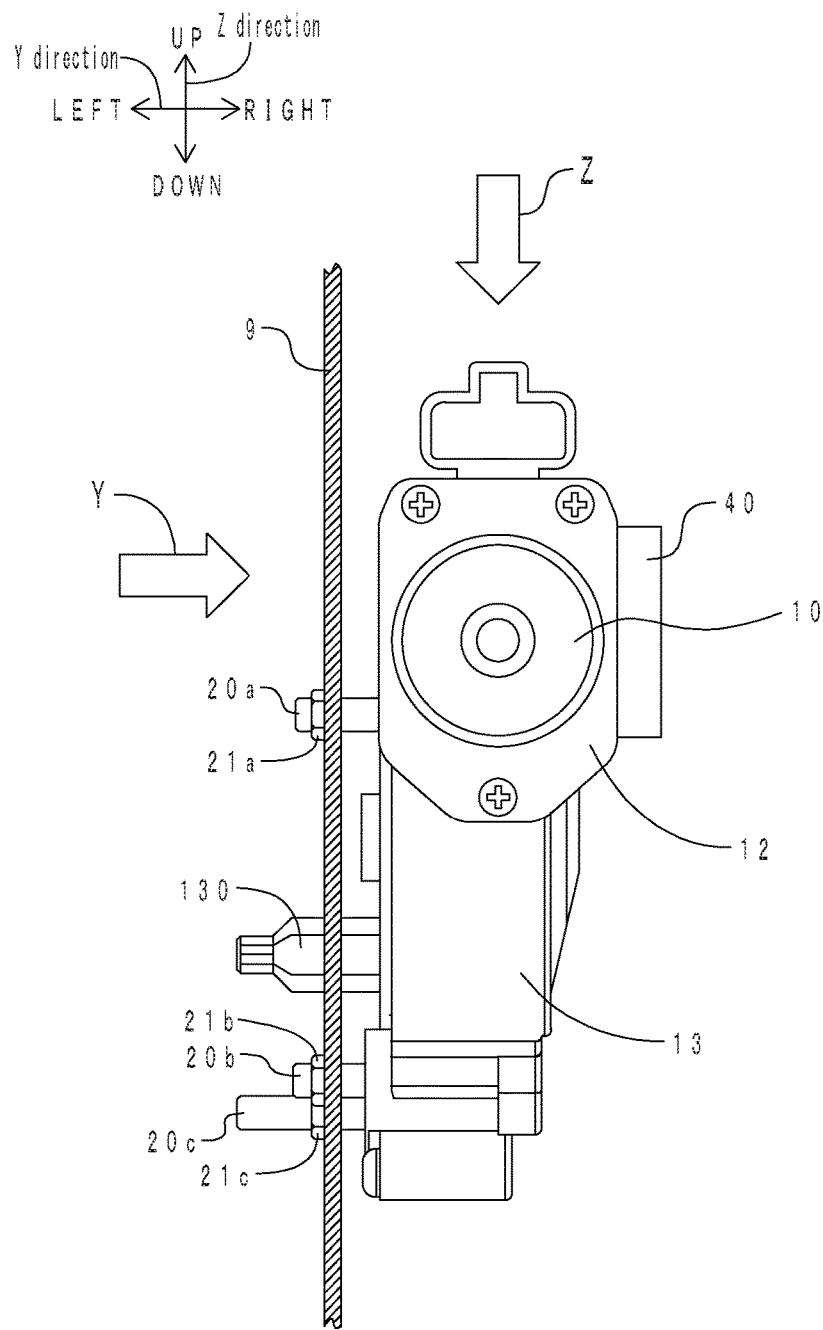

[FIG. 6]
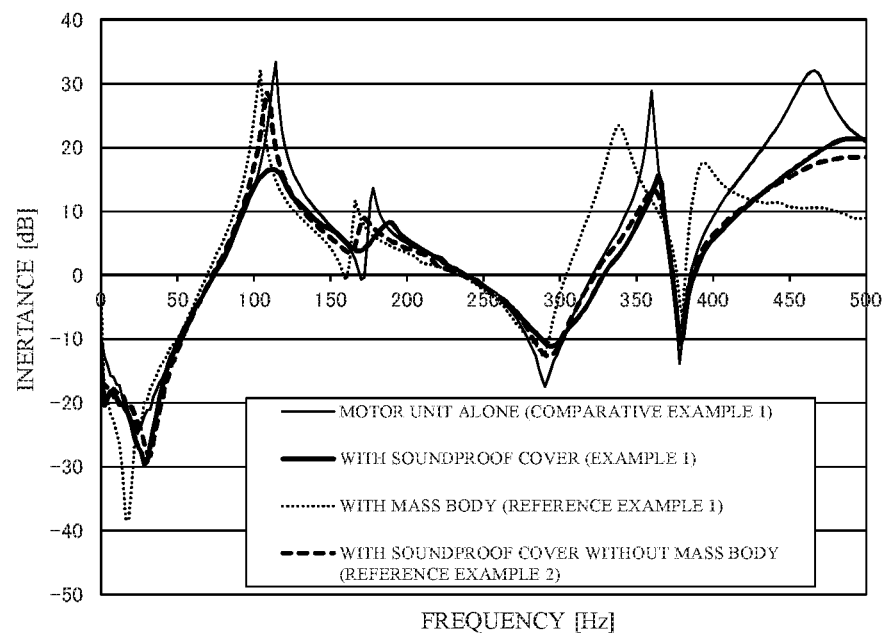
[FIG. 7]
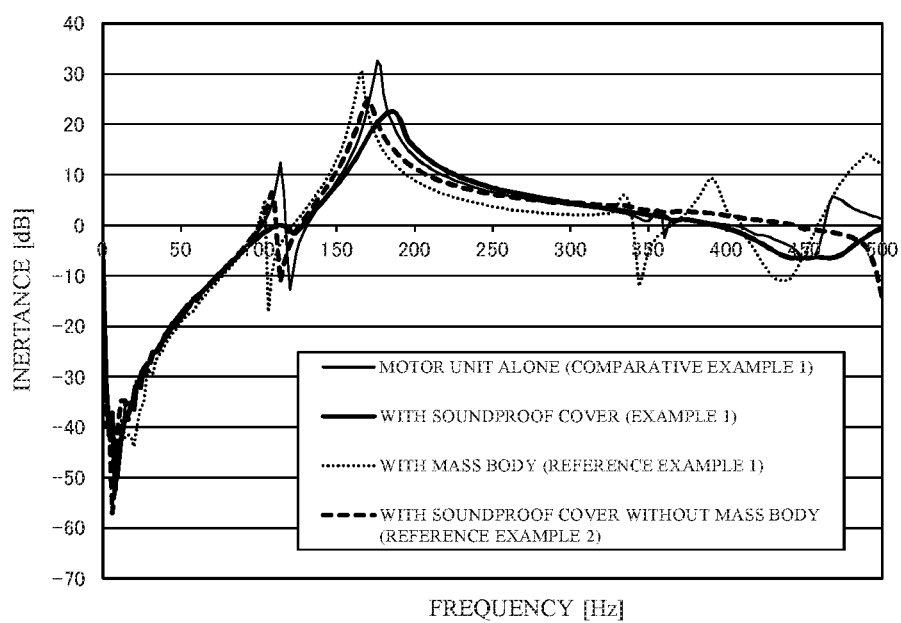

[FIG. 8A]
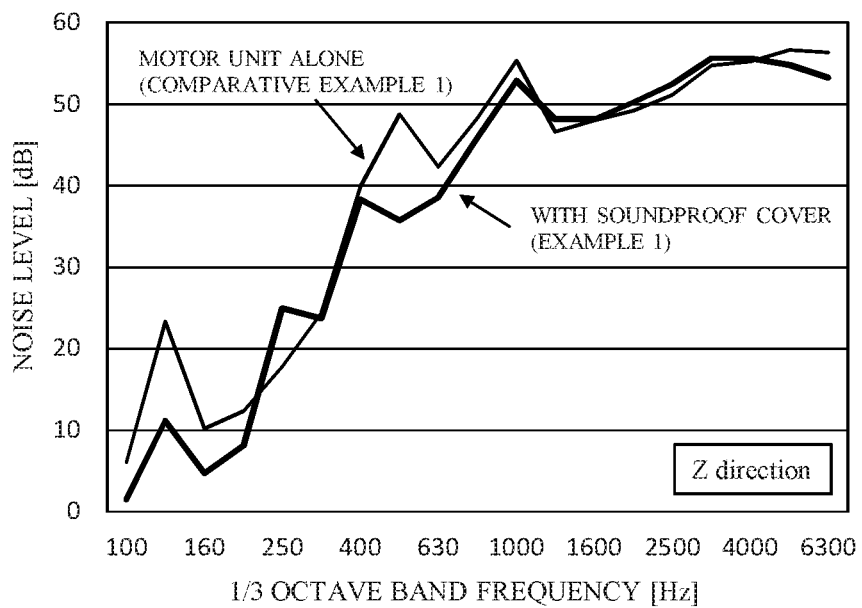
[FIG. 8B]
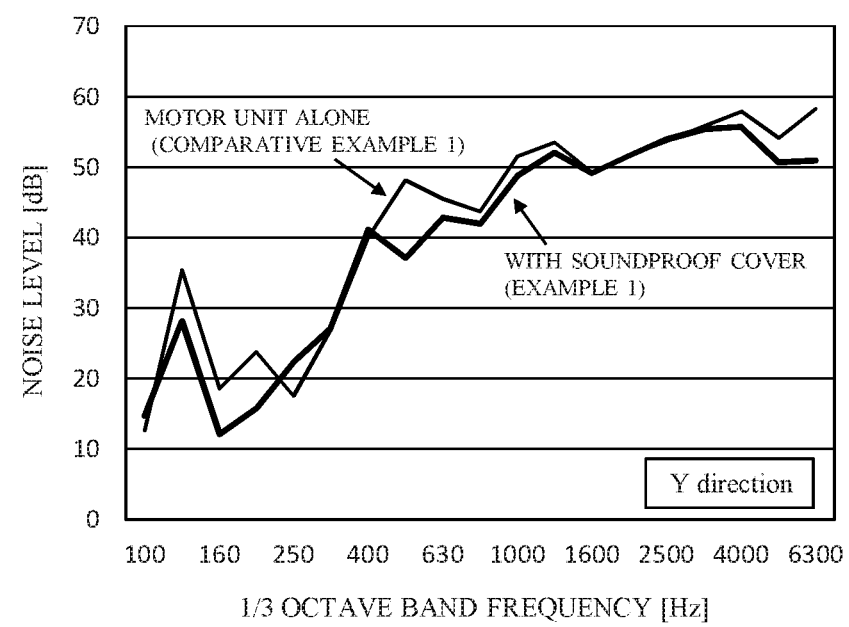

SOUNDPROOF COVER

INCORPORATION BY REFERENCE

The disclosure of Japanese Patent Application No. 2016-072636 filed on Mar. 31, 2016 including the specification, drawings and abstract is incorporated herein by reference in its entirety.

BACKGROUND OF THE INVENTION

1. Field of the Invention

The present invention relates to a soundproof cover mounted to a power seat motor unit.

2. Description of the Related Art

A power seat mounted on a vehicle such as an automobile is provided with a power seat motor unit that electrically adjusts the front-rear position, the height, and the backrest angle of the seat (see Japanese Patent Application Publication No. 2015-209073 (JP 2015-209073 A)). The power seat motor unit is constituted of a combination of a plurality of components such as a motor and a gear. The seat can be moved in the front-rear direction and the height and the backrest angle of the seat can be varied as the gear is rotated by drive of the motor to rotate a drive shaft. In recent years, it has been desired to reduce vibration and noise in a cabin, and it has also been required to reduce a drive sound of the power seat motor unit.

A foam such as a polyurethane foam is often used as a sound absorption material for reducing noise. For example, Japanese Patent Application Publication No. 2015-069012 (JP 2015-069012 A) discloses a sound absorption cover made of a foam that contains a magnetic filler. In the sound absorption cover described in JP 2015-069012 A, the magnetic filler which has a high thermal conductivity is oriented in the thickness direction of the sound absorption cover. This allows not only a reduction of a motor sound, but also immediate discharge of heat generated by the motor via the magnetic filler.

When the power seat motor unit is driven, a radiated sound from the motor and a first gear and a structure borne sound from an attachment portion to a seat frame are generated. The rotational direction and the rotational speed of the motor are varied by a seat operation, and therefore the frequency of noise is varied. The sound absorption cover which uses a foam described in JP 2015-069012 A is effective in reducing noise at a high frequency from the motor. However, the sound absorption cover has little effect in reducing noise at a low frequency of 500 Hz or less such as the structure borne sound.

A dynamic damper is known as a device that reduces vibration (see Japanese Examined Patent Publication No. 6-100245 and Japanese Utility Model Application Publication No. 6-71938). In the dynamic damper, in general, a mass body is elastically supported on an attachment member, which is attached to a vibrating body as a vibration suppression target, via an elastic body such as rubber. When the vibrating body is vibrated at a particular frequency, the mass body and the elastic body constitute a mass-spring vibration system to resonate, and absorb and reduce vibration of the vibrating body. Although the dynamic damper is effective in reducing noise at a low frequency, the dynamic damper cannot reduce noise at a high frequency. In addition, the dynamic damper reduces noise in a narrow frequency band, and does not provide a sufficient noise reduction effect for an object that vibrates at a varied frequency such as in a case where the rotational direction and the rotational speed of the motor are varied.

SUMMARY OF THE INVENTION

The present invention has been made in view of such circumstances, and has an object to provide a soundproof cover capable of reducing noise in a wide frequency band from a high frequency to a low frequency in a power seat motor unit.

(1) In order to address the foregoing issue, the present invention provides a soundproof cover provided in a power seat motor unit that is attached to a frame member of a seat and that has a motor and a gear box that includes a built-in gear assembly, the soundproof cover being mounted to a first gear box, which houses a first gear, of the gear box, the soundproof cover including: a foam disposed on at least an X-Z surface of the first gear box; a cover member disposed on an outer side of the foam; and a mass body interposed between the foam and the cover member and disposed at a position corresponding to at least the X-Z surface of the first gear box in contact with the foam, in a case where, in the first gear box, an axial direction of the motor is defined as an X direction, a direction of attachment to the frame member, which is one of two directions that are orthogonal to the X direction, is defined as a Y direction, and the remaining direction is defined as a Z direction.

The soundproof cover according to the present invention has the foam, the cover member, and the mass body which is disposed between the foam and the cover member. The mass body is elastically supported by the foam. A so-called mass-spring vibration prevention effect can be obtained with the foam and the cover member serving as a composite spring and with the addition of the mass body thereto. The soundproof cover according to the present invention has a mass-spring vibration prevention function in addition to the sound absorption and sound insulation functions achieved by the foam and the cover member, thereby achieving both reduction of a radiated sound propagated through air and reduction of a structure borne sound. That is, with the soundproof cover according to the present invention, it is possible to reduce not only noise at a high frequency such as a radiated sound but also noise at a low frequency of 500 Hz or less propagated through a solid matter.

With the soundproof cover according to the present invention, the eigenfrequency of the soundproof cover can be changed by changing the spring constant of one or both of the foam and the cover member. As a matter of course, the eigenfrequency can be changed by changing the mass of the mass body. In this way, the soundproof cover according to the present invention can be easily tuned in accordance with the frequency of vibration desired to be reduced.

According to the discussion by the inventor, it was found that the first gear box had a resonant frequency of around 125 Hz in the Y direction which is the direction of attachment to the frame member. In the soundproof cover according to the present invention, the foam, the mass body, and the cover member are disposed on at least the X-Z surface of the first gear box. The X-Z surface of the first gear box is a surface that is perpendicular to the Y direction. Thus, it is possible to effectively reduce noise at a low frequency propagated in the Y direction.

(2) In the configuration described in (1), preferably, the gear box is attached in a cantilever manner to the frame member in the Y direction.

A rotary body such as the first gear is housed in the first gear box. In the case where the gear box is attached in a cantilever manner in the Y direction, it is considered that the first gear box generates noise in two directions, namely the Y direction (attachment direction) and the Z direction (direction of gravity). In the soundproof cover according to the present invention, the foam, the mass body, and the cover member are disposed on at least the X-Z surface of the first gear box. Consequently, it is possible to reduce noise in both the Y direction and the Z direction.

(3) In the configuration described in (1) or (2), preferably, the foam and the cover member are disposed so as to cover the X-Z surface and an X-Y surface of the first gear box, and the soundproof cover has an L-shape as a whole.

With this configuration, two surfaces, namely the X-Z surface and the X-Y surface, of the first gear box are covered by the foam and the cover member. Therefore, the sound absorption and sound insulation effects of the foam and the cover member are enhanced to further reduce noise in both the Y direction and the Z direction. In addition, the soundproof cover can be easily attached to the first gear box.

(4) In the configuration described in any one of (1) to (3), preferably, vibration of the first gear box to be suppressed in the Y direction and the Z direction has a frequency of 500 Hz or less.

As discussed above, it is considered that the first gear box generates noise in two directions, namely the Y direction and the Z direction. Thus, if vibration at a low frequency in the two directions can be reduced, noise from the power seat motor unit can be reduced effectively.

(5) In the configuration described in any one of (1) to (4), preferably, the foam and the cover member are made of a resin or an elastomer.

According to this configuration, it is possible to easily shape the foam and the cover member, and to reduce the weight of the soundproof cover. In the case where the cover member is constituted of an elastomer, in particular, the resonant frequency can be adjusted by changing the modulus of elasticity of the cover member. Therefore, the adjustable range of the resonant frequency can be widened compared to a case where the cover member is constituted of a metal or a resin. If the cover member is made of an elastomer, even in the case where a secondary radiated sound is generated along with natural vibration of the cover member, it is possible to reduce the effect of the secondary radiated sound by adjusting the eigenvalue of the cover member to a low frequency band in which auditory sensitivity is low such as 100 Hz or less, for example. In addition, generation of the secondary radiated sound can be suppressed by the attenuation effect of the elastomer.

Being "made of a resin or an elastomer" only requires that the base materials of the foam and the cover member should be a resin or an elastomer, and the foam and the cover member may contain materials other than a resin or an elastomer. Herein, the elastomer includes crosslinked rubber and a thermoplastic elastomer.

(6) In the configuration described in any one of (1) to (5), preferably, the foam has a base material constituted of a resin or an elastomer and a magnetic filler contained in the base material, and the magnetic filler is oriented so as to be connected in the Y direction.

The foam according to this configuration has different spring constants in the Y direction and the Z direction because of the orientation of the magnetic filler. The spring constant in the Y direction in which the magnetic filler is oriented is large compared to that in the Z direction. Therefore, the eigenfrequency in the Y direction is higher than that in the Z direction. On the other hand, the spring constant in the Z direction is small compared to that in the Y direction. Therefore, the eigenfrequency in the Z direction is lower than that in the Y direction. Consequently, the soundproof cover can also support a case where the first gear box has different resonant frequencies in the Y direction and the Z direction, for example.

The foam such as a polyurethane foam has a large number of cells (air bubbles) inside, and therefore has a low thermal conductivity. Therefore, if the outside of the first gear box is covered by the foam, heat tends to be accumulated in the first gear box. In this respect, the magnetic filler which has a relatively high thermal conductivity is oriented so as to be connected in the Y direction in the foam according to this configuration. Therefore, heat generated by the first gear box can be immediately discharged via the magnetic filler which is oriented.

BRIEF DESCRIPTION OF THE DRAWINGS

FIG. 1 is a right side view of a power seat motor unit to which a soundproof cover according to an embodiment is mounted;

FIG. 2 is a sectional view of the soundproof cover taken along the line II-II of FIG. 1;

FIG. 3 is a schematic view illustrating the state of orientation of a magnetic filler in a foam of the soundproof cover;

FIG. 4 is an attachment view of a power seat motor unit with a soundproof cover according to Example 1;

FIG. 5 is an attachment view of a power seat motor unit with a mass body according to Reference Example 1;

FIG. 6 is a graph indicating the measurement result of an inertance in the Y direction with respect to an impact in the Y direction;

FIG. 7 is a graph indicating the measurement result of an inertance in the Z direction with respect to an impact in the Z direction;

FIG. 8A is a graph of a noise level in the Z direction as measured by a microphone A; and FIG. 8B is a graph of a noise level in the Y direction as measured by a microphone B.

DETAILED DESCRIPTION OF THE EMBODIMENTS

A soundproof cover according to an embodiment of the present invention will be described below. First, the configuration of the soundproof cover according to the embodiment will be described. FIG. 1 is a right side view of a power seat motor unit to which the soundproof cover according to the embodiment is mounted. FIG. 2 is a sectional view of the soundproof cover taken along the line II-II of FIG. 1. FIG. 3 schematically illustrates the state of orientation of a magnetic filler in a foam of the soundproof cover. For convenience of illustration, the foam is not hatched in FIG. 3. In FIGS. 1 to 3, the axial direction (front-rear direction) of a motor is defined as the X direction, the direction (left-right direction) of attachment to a side frame, which is one of two directions that are orthogonal to the X direction, is defined as the Y direction, and the remaining direction (up-down direction) is defined as the Z direction.

As illustrated in FIGS. 1 and 2, a power seat motor unit 1 according to the embodiment includes a motor 1 and a gear box 11. The gear box 11 includes a built-in gear assembly in which a plurality of gears are coupled to each other. The gear box 11 has a first gear box 12 that houses a first gear and a second gear box 13 that follows the first gear box 12. The motor 10 is attached to the front end of the first gear box 12.

The power seat motor unit 1 is used to adjust the height of a seat of an automobile. The power seat motor unit 1 is attached to the outer side of a side frame 2, which is a portion of a seat frame, that extends in the front-rear direction on the right side. In the power seat motor unit 1, the second gear box 13 is fixed to the side frame 2 by three bolts 20a, 20b, and 20c. Consequently, the gear box 11, and hence the power seat motor unit 1, is attached in a cantilever manner to the side frame 2. The side frame 2 is included in the concept of the frame member according to the present invention. An output shaft 130 projects leftward (toward the inner side of the seat) from the left surface of the second gear box 13.

The soundproof cover 3 is mounted to the first gear box 12 which houses the first gear. The soundproof cover 3 covers two surfaces, namely an upper surface 120 (X-Y surface) and a right surface 121 (X-Z surface), of the first gear box 12. The soundproof cover 3 has an L-shape as seen from the front. The soundproof cover 3 has a foam 30, a cover member 31, and a mass body 32.

The foam 30 is disposed so as to cover the two surfaces, namely the upper surface 120 and the right surface 121, of the first gear box 12. The foam 30 has an L-shape as seen from the front. The foam 30 is made of a polyurethane foam that contains composite particles obtained by compositing graphite particles with stainless steel particles. As illustrated in FIG. 3, composite particles 300 are oriented so as to be arranged consecutively in the left-right direction (Y direction). That is, the composite particles 300 are oriented so as to be connected in the surface direction of the foam 30 in the upper surface 120 of the first gear box 12, and in the thickness direction of the foam 30 in the right surface 121. The composite particles 300 are included in the concept of the magnetic filler according to the present invention. Since the composite particles 300 are oriented in the Y direction, the spring constant of the foam 30 in the Y direction is larger than the spring constant thereof in the Z direction.

The cover member 31 is made of an acrylonitrile-butadiene-styrene (ABS) resin, and disposed so as to cover the foam 30 on the two surfaces, namely the upper surface 120 and the right surface 121, of the first gear box 12. The cover member 31 has an L-shape as seen from the front. A portion of the cover member 31 that covers the right surface 121 of the first gear box 12 is formed with a recessed portion 310 that houses the mass body 32.

The mass body 32 is made of iron, and has a rectangular plate shape. The mass body 32 has a mass of 110 g. The mass body 32 is fitted in the recessed portion 310 of the cover member 31. The mass body 32 is disposed in contact with a portion of the foam 30 which covers the right surface 121 of the first gear box 12.

Next, the function and effect of the soundproof cover according to the embodiment will be described. The soundproof cover 3 has the foam 30, the cover member 31, and the mass body 32. The mass body 32 is elastically supported by the foam 30. A so-called mass-spring vibration prevention effect can be obtained with the foam 30 and the cover member 31 serving as a composite spring and with the addition of the mass body 32 thereto. Hence, the soundproof cover 3 has a mass-spring vibration prevention function in addition to the sound absorption and sound insulation functions achieved by the foam 30 and the cover member 31. Thus, the soundproof cover 3 can reduce both a radiated sound and a structure borne sound. That is, with the soundproof cover 3, it is possible to reduce not only noise at a high frequency but also noise at a low frequency of 500 Hz or less.

The eigenfrequency of the soundproof cover 3 may be changed by changing the spring constant of one or both of the foam 30 and the cover member 31, or by changing the mass of the mass body 32. Hence, the soundproof cover 3 can be easily tuned in accordance with the frequency of vibration desired to be reduced.

The power seat motor unit 1 is attached in a cantilever manner to the side frame 2. More specifically, the gear box 11 which includes the first gear box 12 to which the soundproof cover 3 is mounted is attached in a cantilever manner to the side frame 2. The foam 30 and the cover member 31 cover the two surfaces, namely the upper surface 120 (X-Y surface) and the right surface 121 (X-Z surface), of the first gear box 12. The mass body 32 is disposed on the same side as the right surface 121 (X-Z surface) of the first gear box 12. Consequently, noise in the Y direction and the Z direction generated from the first gear box 12 can be effectively reduced. In addition, the soundproof cover 3 has an L-shape, and therefore can easily be attached to the first gear box 12.

The foam 30 is made of a polyurethane foam that contains the composite particles 300. The composite particles 300 are oriented so as to be connected in the left-right direction (Y direction). Therefore, heat generated by the first gear box 12 can be immediately discharged via the composite particles 300 which are oriented. In addition, the foam 30 has different spring constants in the Y direction and the Z direction. That is, the foam 30 has different eigenfrequencies in the Y direction and the Z direction. Consequently, the soundproof cover 3 can also support a case where the first gear box 12 has different resonant frequencies in the Y direction and the Z direction.

The cover member 31 is made of an ABS resin. Therefore, the cover member 31 can be shaped easily as with the foam 30. In addition, the weight of the soundproof cover 3 can be reduced. The cover member 31 is formed with the recessed portion 310 which houses the mass body 32. Therefore, the mass body 32 can be easily disposed between the foam 30 and the cover member 31.

The soundproof cover according to an embodiment of the present invention has been described above. However, the present invention is not specifically limited to the embodiment described above. The present invention can be implemented with a variety of modifications and alterations that may be achieved by a person skilled in the art.

The configuration, shape, attachment method, attachment angle, usage, and so forth of the power seat motor unit to which the soundproof cover according to the present invention is mounted are not limited to those according to the embodiment described above. In the embodiment described above, the soundproof cover has an L-shape. However, the shape of the soundproof cover is not specifically limited. The soundproof cover may be disposed on only one surface of the first gear box, may be disposed separately on non-continuous surfaces, and may be disposed so as to cover three or more surfaces. The foam, the mass body, and the cover member may be disposed on at least an X-Z surface of the first gear box. It is desirable that the foam, the mass body, and the cover member should be disposed on an X-Z surface of the first gear box on the opposite side from the frame member, among other surfaces. Although the mass body is disposed only on the same side as the X-Z surface in the embodiment described above, an additional mass body may be disposed on the same side as the X-Y surface.

Although the foam, the cover member, and the mass body may only be stacked on each other, they may be fixed to an adjacent member using a double-sided tape, an adhesive, or the like.

The material, the shape, the thickness, and so forth of the foam are not limited to those according to the embodiment described above. For example, the thickness of the foam may be constant, or may be varied in accordance with the location. In the case where the heat radiation performance is taken into consideration, for example, it is desirable that the area of contact with the first gear box should be increased. The material of the foam may be a foamed resin or a foamed elastomer such as a polyethylene foam or a polypropylene foam, besides the polyurethane foam. The foam may be formed from only a resin or an elastomer. However, the foam may contain a magnetic filler that can be oriented in a predetermined direction as in the embodiment described above. The magnetic filler may be a ferromagnetic material such as iron, nickel, cobalt, gadolinium, and stainless steel, an antiferromagnetic material such as MnO, $Cr_2O_3$, $FeCl_2$, and MnAs, and alloys that contain such materials. Among others, stainless steel, a copper-iron alloy, and so forth are suitable in terms of having a high thermal conductivity and being highly processable as a filler. From the viewpoint of improving the heat radiation performance, in addition, composite particles in which magnetic particles are adhered to the surfaces of thermally conductive particles with a high thermal conductivity may be used as the magnetic filler. The material of the thermally conductive particles is preferably a carbon material such as graphite, expanded graphite, and carbon fibers.

The material, the shape, and so forth of the cover member are also not specifically limited. The material of the cover member is preferably a resin or an elastomer. Examples include an ABS resin, a polypropylene (PP) resin, a polyamide (PA) resin, an olefin elastomer (TPO), a styrene elastomer (TPS), a urethane elastomer (TPU), natural rubber (NR), ethylene-propylene-diene rubber (EPDM), nitrile rubber (NBR), chloroprene rubber (CR), butyl rubber (IIR), and silicone rubber (Q). Materials obtained by combining various types of reinforcements with such materials and composite materials of such materials and other materials may also be used. The cover member is preferably disposed so as to cover the foam from the outer side.

The material, the shape, the mass, and so forth of the mass body are also not specifically limited. For example, the mass of the mass body may be adjusted in accordance with the frequency of vibration desired to be reduced. A mass body with a flat plate shape can be manufactured by press blanking, and therefore is preferable in terms of ease of manufacture and cost.

EXAMPLES

Next, the present invention will be described more specifically using examples.
<Inertance Measurement>
[Measurement Method]

(1) Example 1

The power seat motor unit (see FIGS. 1 and 2) to which the soundproof cover according to the embodiment described above was mounted was used to verify the vibration reduction effect of the soundproof cover. The soundproof cover was manufactured and attached to the power seat motor unit as follows. First, a mixed material containing polyol, polyisocyanate, and composite particle powder was foamed to manufacture an L-shaped foam. Next, an L-shaped cover member was shaped from an ABS resin, and a mass body was fitted into a recessed portion. Then, the foam was fixed to the upper surface (X-Y surface) and the right surface (X-Z surface) of a first gear box using an adhesive, and the cover member was assembled together with the mass body so as to cover the foam. The thus obtained power seat motor unit with the soundproof cover was attached in a cantilever manner to one surface of a metal plate disposed to extend vertically in the up-down direction.

FIG. 4 is an attachment view of the power seat motor unit with the soundproof cover. FIG. 4 illustrates a state in which the power seat motor unit with the soundproof cover is seen from the front. Members in FIG. 4 that correspond to those in FIG. 1 are denoted by the same reference numerals. As illustrated in FIG. 4, the second gear box 13 which is in rear of the first gear box 12 is fixed to a metal plate 9 by three pairs of bolts 20a, 20b, and 20c and nuts 21a, 21b, and 21c. Consequently, the power seat motor unit 1 is attached in a cantilever manner to the metal plate 9. The metal plate 9 is provided with a circular opening portion at a position corresponding to the first gear box 12. An acceleration pickup (not illustrated) is attached to the rear lower end of the left side surface of the first gear box 12. The acceleration pickup is connected to a fast Fourier transform (FFT) analyzer. In this example, a "4507C" manufactured by Brüel & Kjaer (B&K) was used as the acceleration pickup. In addition, a "PLUSE/Labshop" also manufactured by B&K was used as the FFT analyzer.

First, as indicated by a white arrow Y in FIG. 4, the left surface of the first gear box 12 was hit by an impact hammer from the left side (Y direction) of the metal plate 9 to measure the inertance of the first gear box 12 in the Y direction. Next, as indicated by a white arrow Z in FIG. 4, the upper surface of the first gear box 12 was hit by an impact hammer from above (Z direction) to measure the inertance of the first gear box 12 in the Z direction. The inertance is a value calculated as A/F, where F represents an excitation force applied to the first gear box 12 and A represents an acceleration generated at a measurement point of the first gear box 12 (a point at which the acceleration pickup is disposed). The inertance is an index that represents the response of a vibration level to a unit excitation force. For application of the same excitation force by a motor (when the motor is actuated), vibration from the power seat motor unit (first gear box) is considered to be larger as the value of the inertance is larger.

(2) Comparative Example 1

For comparison, the inertance of the first gear box in the Y direction and the Z direction was measured in the same manner as in Example 1 using a power seat motor unit to which no soundproof cover was mounted.

(3) Reference Example 1

As Reference Example 1, the inertance of the first gear box in the Y direction and the Z direction was measured in the same manner as in Example 1 using a power seat motor unit in which only a mass body was disposed in place of a soundproof cover.

FIG. 5 is an attachment view of the power seat motor unit with the mass body. FIG. 5 corresponds to FIG. 4. As illustrated in FIG. 5, a mass body 40 is disposed on the right surface of the first gear box 12. As with the mass body used in the soundproof cover according to the embodiment described above, the mass body 40 is made of iron, and has a rectangular plate shape. The mass body 40 has a mass of 110 g.

(4) Reference Example 2

As Reference Example 2, the inertance of the first gear box in the Y direction and the Z direction was measured in the same manner as in Example 1 using a power seat motor unit in which a soundproof cover not having a mass body was mounted. The soundproof cover mounted to the power seat motor unit according to Reference Example 2 was obtained by removing only the mass body from the soundproof cover according to the embodiment described above. That is, in FIG. 2, the recessed portion 310 of the cover member 31 was filled with the foam 30 in place of the mass body.

[Measurement Result]

FIG. 6 indicates the measurement result of an inertance in the Y direction with respect to an impact in the Y direction. FIG. 7 indicates the measurement result of an inertance in the Z direction with respect to an impact in the Z direction.

As illustrated in FIG. 6, in the case where vibration was applied from the Y direction, the inertance of the power seat motor unit alone (Comparative Example 1) in the Y direction was peaked around 114 Hz, 360 Hz, and 468 Hz. In contrast, the inertance of the power seat motor unit with the soundproof cover according to the present invention (Example 1) had smaller peak values at the corresponding frequencies. In addition, as illustrated in FIG. 7, in the case where vibration was applied from the Z direction, the inertance of the power seat motor unit alone (Comparative Example 1) in the Z direction was peaked around 178 Hz. In contrast, the inertance of the power seat motor unit with the soundproof cover according to the present invention (Example 1) had a smaller peak value at the corresponding frequency. That is, in the case where the soundproof cover according to the present invention was mounted, the vibration level in a low frequency band of 500 Hz or lower, which was problematic when the power seat motor unit was used alone, was reduced. It is seen that the effect of the soundproof cover according to the present invention in suppressing vibration in a low frequency band was achieved in two directions, namely the Y direction and the Z direction. From the above, it was verified that the use of the soundproof cover according to the present invention reduced noise at a low frequency of 500 Hz or less.

With the power seat motor units according to Reference Examples 1 and 2, the peaks (Y direction: 114 Hz; Z direction: 178 Hz) of the inertance of the power seat motor unit alone (Comparative Example 1) were merely slightly displaced toward the low frequency side, and the power seat motor units according to Reference Examples 1 and 2 did not have an effect in reducing the peak values.

<Noise Measurement>

[Measurement Method]

The power seat motor unit with the soundproof cover according to Example 1 and the power seat motor unit alone according to Comparative Example 1 were used to verify the noise reduction effect of the soundproof cover. First, as in the inertance measurement described above, the power seat motor unit with the soundproof cover according to Example 1 and the power seat motor unit according to Comparative Example 1 were each attached in a cantilever manner to a surface of a metal plate, and the motor was driven. The motor was driven at a constant voltage of 16 V such that its output shaft makes 1.25 rotations clockwise as seen from the left side (the metal plate 9 side) in FIGS. 4 and 5. A microphone A was disposed 80 mm away from the first gear box above (Z direction) the first gear box and a microphone B was disposed 50 mm away from the first gear box on the right side (Y direction) to measure the level of noise generated during drive. The noise level was measured using a measurement device "Type 3160-A-042" and measurement software "PULSE Time Data Recorder" manufactured by Brül & Kjaer (B&K).

[Measurement Result]

FIG. 8A indicates a noise level as measured by the microphone A (noise level in the Z direction). FIG. 8B indicates a noise level as measured by the microphone B (noise level in the Y direction).

As indicated in FIGS. 8A and 8B, when the power seat motor unit with the soundproof cover (Example 1) was compared with the power seat motor unit alone (Comparative Example 1), the noise level was reduced around 125 Hz (cut off frequency band: 111.4 to 140.3 Hz), 160 Hz (cut off frequency band: 142.5 to 179.6 Hz), 400 Hz (cut off frequency band: 356.3 to 449.0 Hz), and 500 Hz (cut off frequency band: 445.4 to 561.3 Hz) at ⅓ octave band frequency in both the Z direction and the Y direction. This matches the result of the inertance measurement discussed earlier. In this way, it was verified that the use of the soundproof cover according to the present invention reduced noise at a low frequency of 500 Hz or less.

What is claimed is:

1. A soundproof cover provided in a power seat motor unit that is attached to a frame member of a seat and that has a motor and a gear box that includes a built-in gear assembly, the soundproof cover being mounted to a first gear box, which houses a first gear, of the gear box, the soundproof cover comprising:
    a foam disposed on at least an X-Z surface of the first gear box;
    a cover member disposed on an outer side of the foam;
    a flat rectangular plate shaped mass body; and
    a recessed portion in the cover member that corresponds to a shape of the flat rectangular plate shaped mass body,
    wherein the flat rectangular plate shaped mass body is housed in the recessed portion, is interposed between the foam and the cover member and is disposed at a position corresponding to at least the X-Z surface of the first gear box in contact with the foam, in a case where, in the first gear box, an axial direction of the motor is defined as an X direction, a direction of attachment to the frame member, which is one of two directions that are orthogonal to the X direction, is defined as a Y direction, and the remaining direction is defined as a Z direction.

2. The soundproof cover according to claim 1, wherein the gear box is attached in a cantilever manner to the frame member in the Y direction.

3. The soundproof cover according to claim 1, wherein the foam and the cover member are disposed so as to cover the X-Z surface and an X-Y surface of the first gear box, and the soundproof cover has an L-shape as a whole.

4. The soundproof cover according to claim 1, wherein vibration of the first gear box to be suppressed in the Y direction and the Z direction has a frequency of 500 Hz or less.

5. The soundproof cover according to claim 1, wherein the foam and the cover member are made of a resin or an elastomer.

6. The soundproof cover according to claim 1, wherein the foam has a base material constituted of a resin or an elastomer and a magnetic filler contained in the base material, and the magnetic filler is oriented so as to be connected in the Y direction.

\* \* \* \* \*